May 9, 1939. W. H. McELWAIN 2,157,619
COMBINED HARVESTER AND GRINDER
Filed April 17, 1936 3 Sheets-Sheet 1
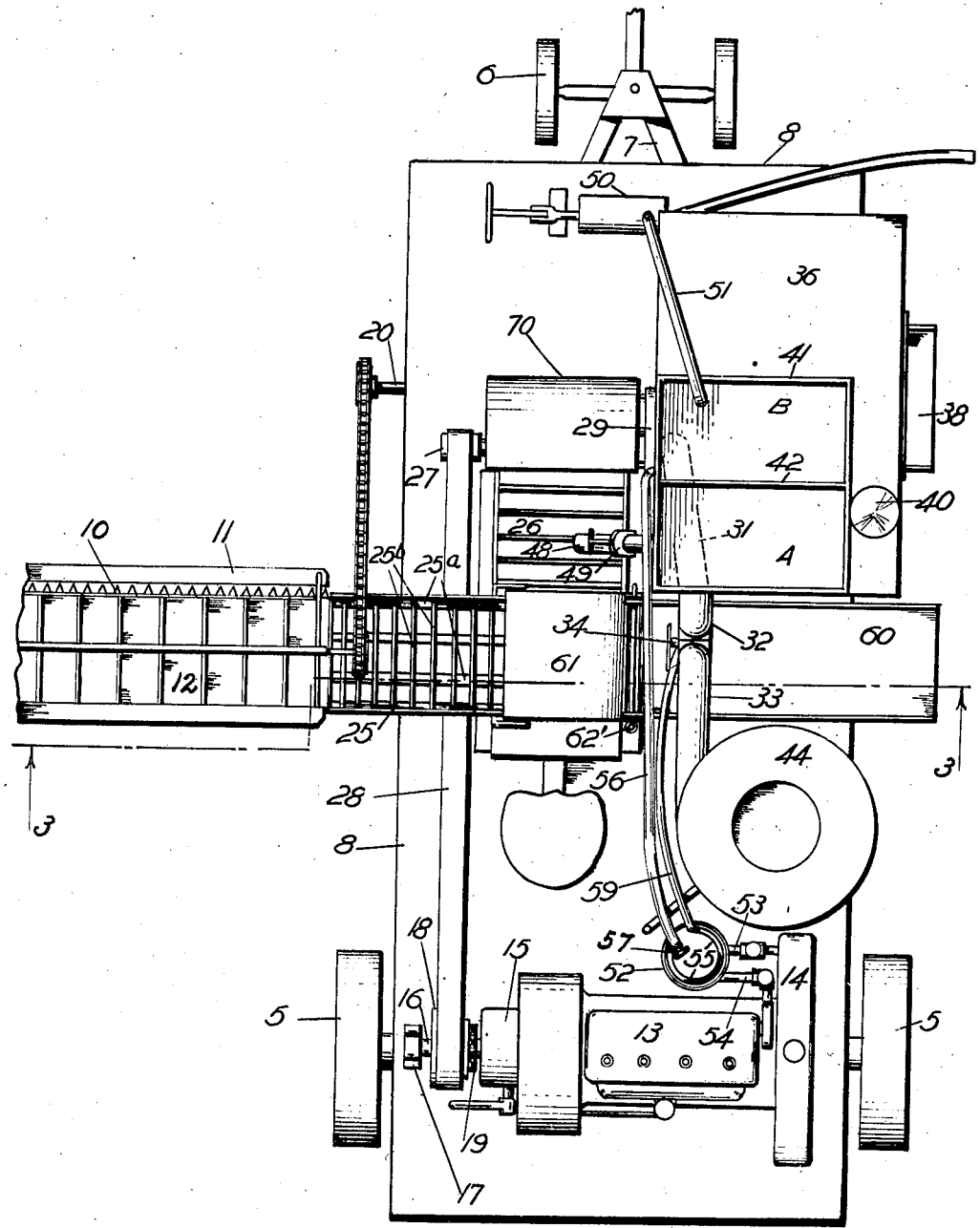
Fig. 1.
INVENTOR.
WILLIAM H. MCELWAIN
BY
ATTORNEY.

May 9, 1939. W. H. McELWAIN 2,157,619
COMBINED HARVESTER AND GRINDER
Filed April 17, 1936 3 Sheets-Sheet 2
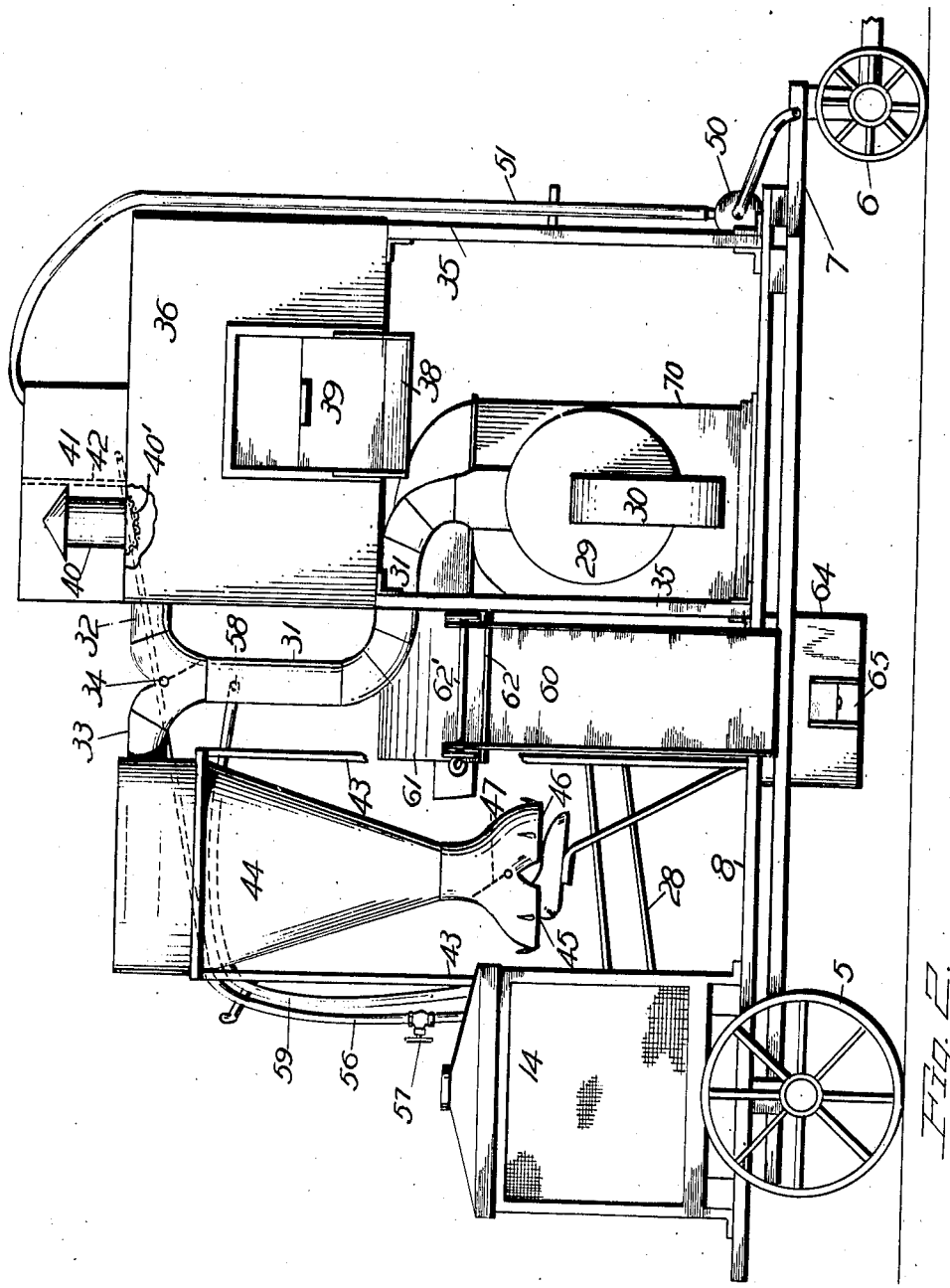
INVENTOR.
WILLIAM H. MCELWAIN
BY
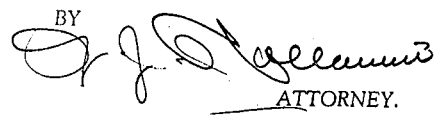
ATTORNEY.

May 9, 1939.  W. H. McELWAIN  2,157,619
COMBINED HARVESTER AND GRINDER
Filed April 17, 1936   3 Sheets-Sheet 3
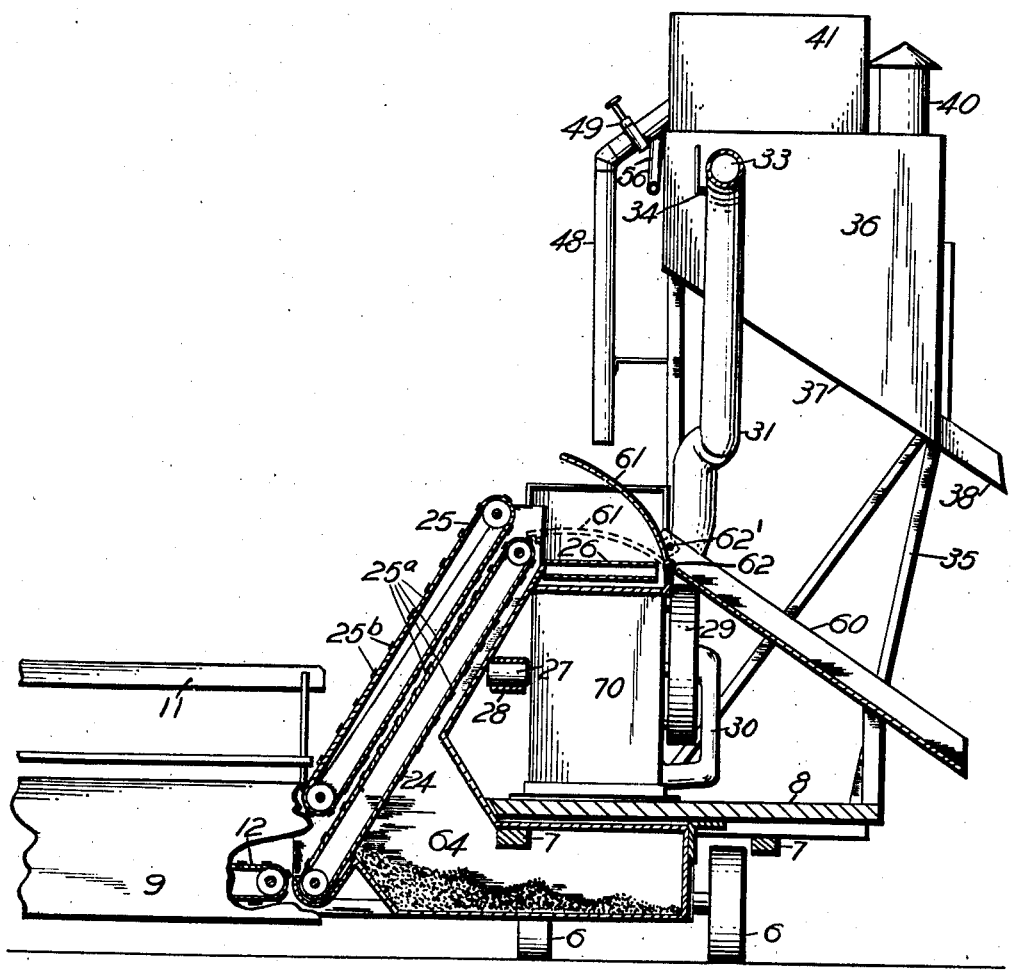
Fig. 3.
INVENTOR.
WILLIAM H. MCELWAIN
BY
ATTORNEY.

Patented May 9, 1939

2,157,619

UNITED STATES PATENT OFFICE 2,157,619

COMBINED HARVESTER AND GRINDER

William H. McElwain, Denver, Colo., assignor of one-fourth to Paul M. Clark and one-fourth to John M. Eckley, both of Denver, Colo.

Application April 17, 1936, Serial No. 74,927

5 Claims. (Cl. 56—1)

This invention relates to improvements in harvesting machines and relates more particularly to an improved harvester and grinder.

It is customary in many places to employ combined cutting and threshing machines for harvesting wheat and other grain. In many cases, the farmer feeds his crop to cattle and other domestic animals or sells it to others who do so, and in such cases he is concerned primarily in obtaining the greatest possible food value from his crop.

Where the usual combine is used, the straw is usually spread over the field and is valuable as fertilizer only.

It is well understood that grain stalks and the like, in addition to their value as a roughage, also possess considerable feed value and when properly mixed with grain, greatly reduce the amount of the latter required for a given result. Domestic animals will, however, reject such roughage when it is offered to them in a condition in which the grain can be readily sorted therefrom.

It is an object of this invention to produce a harvesting machine of such construction that it will produce a feed in which grain and roughage are properly mixed and ground so that the animal to which it is offered must eat the roughage as well as the grain.

Another object is to produce a combined harvesting machine and grinder having means for adding to the grain other ingredients, such as cottonseed and molasses, essential to a fattening diet.

A further object is to produce a harvesting machine of such construction that the grain or alfalfa that is cut can be directed to a hammer mill or deposited in windrows for drying, to be picked up later by the same machine and ground.

A still further object is to produce a machine in which the ground material can be directed to a cyclone cleaner and sacker or deposited in an elevated tank from which it can be flowed into a truck.

Another object is to provide a machine of the class described, with means for mixing a quantity of molasses with the ground feed and for heating the same so as to increase its flowability.

A still further object of the invention is to produce a combined harvesting machine and grinder, which can readily be converted into a windrower, and provided with a pick-up for transferring the windrowed material to the machine.

Another object is to provide a machine of the character described that will collect and save grain that shakes free from the stem or hull.

Another object of the invention is to provide a machine that will save time and labor by converting a standing crop into a finished ground feed in one continuous operation, thereby accomplishing in one operation what heretofore required several operations and repeated handlings.

In former practice, the crop was harvested and hauled to a distant point, where it was stacked or placed in a grainery. Later, it was pitched by hand into a reduction mill, from which it was sacked, in many cases after it was mixed with molasses, cottonseed meal, or other similar ingredients, in still another operation.

In the present instance, the majority of these operations are eliminated and all of them are accomplished in one continuous action.

The above and any other objects that may appear as this description proceeds are obtained by means of a combination and arrangement of parts that will now be described and for this purpose, reference will be had to the accompanying drawings in which the invention has been illustrated, and in which Figure 1 is a top plan view of the machine forming the subject of this invention;

Figure 2 is a side elevation of the machine illustrated in Figure 1; and

Figure 3 is a cross section taken on line 3—3, Figure 1.

In the drawings, numeral 5 designates the rear wheels of a truck on which the machine is supported, and 6 the front wheels thereof. The truck frame has been shown in a general way only and designated by numeral 7. Supported on the truck is the machine which comprises a floor 8 and a number of separate machines, which will be identified as the description proceeds.

Extending from one side of the truck is a platform 9, of the construction commonly employed in machines of this type. The sickle has been designated by numeral 10, the reel by numeral 11 and the platform canvas by numeral 12. An engine 13 is supported on the floor 8 and is provided with a radiator 14 and a transmission housing 15. The drive shaft 16, which projects from the transmission housing, has its outer end journalled in a bearing 17. Carried by the drive shaft is a belt pulley 18 and a sprocket wheel 19. Power is transmitted from the sprocket wheel 19 by some suitable means, not shown, to the shaft 20 from which it is transmitted to the mechanism which operates the harvester part, comprising the sickle 10, reel 11 and platform canvas 12, as well as the elevators 24 and 25.

The cutting and elevating mechanism is conventional and will therefore not be described with any greater particularity than necessary for the purpose of showing its operation with the other parts.

The elevators are composed of straps or narrow belts 25a on which are mounted cross cleats 25b. They elevate the crop being cut and discharge it onto conveyor 26, leading to the hammer mill 70, when bridge 61 is in the raised position as shown in Figure 3, or onto the bridge 61 and thence over to chute 60 when bridge 61 is lowered to the dotted line position.

The hammer mill shown is of well-known construction and has a shaft to one end of which a pulley 27 is attached. A belt 28 transmits power from pulley 18 to pulley 27. On the side of the hammer mill, opposite from that on which the pulley is located, is a fan 29 whose intake is connected with the interior of the mill near its bottom, by a conduit 30. The outlet of the fan is connected to a pipe 31 which extends upwardly, as shown in Figure 2, terminating in branches 32 and 33. A butterfly valve 34 directs material from pipe 31 to either one of the branches 32 or 33.

Carried by suitable supports 35 and elevated above the mill is a bin 36 whose bottom 37 is outwardly and downwardly inclined, as shown in Figure 3. The bottom terminates in a chute 38. The wall has an opening in line with the chute and this is normally closed by a sliding door 39. The chute is at such height that it will discharge into a wagon or truck body.

Branch 32 connects with the interior of bin 36 and a ventilator 40 permits air to discharge from the bin, as fast as it enters. A suitable screen 40' may be provided in the ventilator to prevent escape of material delivered to the bin.

Positioned on the top of bin 36 is a tank 41 divided into compartments A and B by means of a partition 42.

Carried on supports 43 is a combined cyclone cleaner and sacker 44 having at its lower end the usual two discharge spouts 45 and 46, and a valve 47 that serves to direct material into either spout. Branch 33 connects with the cleaner 44.

A pipe 48 communicates at its upper end with compartment A of tank 41 while its lower end terminates a short distance above the conveyor canvas 26. A gate valve 49 controls the flow of material through pipe 48. Compartment A may be supplied with cottonseed or similar compositions which can be fed onto the conveyor canvas 26 at any desired rate.

Compartment B of tank 41 may contain molasses which can be elevated into it by means of a pump 50 and a pipe 51. The molasses is mixed with the ground feed after it has left the blower and should preferably be heated so as to make it as liquid as possible, and for this purpose a heater has been provided.

The heater consists of a tank 52 (Figure 1) that is connected with the radiator by means of a pipe 53 and with the water pump by means of a pipe 54. A pipe coil 55 is positioned in tank 52. One end of coil 55 is connected by means of a hose or pipe 56 with compartment B of tank 41, which compartment contains the molasses. A valve 57 controls the rate of flow through pipe 56. The other end of coil 55 is connected with a nozzle 58, positioned in pipe 31, by means of a hose 59. When the feed is intended for use at an early date, molasses may be added, but if it is to be stored for a considerable length of time, it is preferably not added.

A chute 60 is provided and extends downwardly and outwardly as shown in Figure 3. A bridge 61 is hinged at 62 and can be moved from dotted to full line position and back again, and held in either position by a pin 62'. When bridge 61 is in full line position, the material discharged from the elevator falls on the conveyor canvas 26 and is carried to the mill. If the grain or alfalfa is too wet or green to grind, the bridge 61 is moved to dotted line position and the material will then pass over and onto the chute 60 and be deposited in windrows. When the windrows are properly dried, the machine is provided with an ordinary pick-up and operated along the windrow, whereupon it is elevated to conveyor 26 which transports it to the hammer mill where it is ground.

The grain that is loosened from the stem or hull, falls through or from elevator 24 and is caught by compartment 64 from which it is removed through the opening, normally closed by door 65.

In the specification and claims, the word "grain" is used in a sense broad enough to include dry alfalfa or clover of any kind or any dry grasses or grains that can be used for feed and harvested in the manner described.

Having described the invention, what is claimed as new is:

1. A machine of the character described for converting standing grain into ground feed, comprising in combination, means for cutting, means for grinding, means for conveying the grain from the cutting to the grinding means, means for adding other grains to the cut grain before it is ground, and means for conveying the ground grain from the grinder to a storage receptacle.

2. A machine of the character described for converting standing grain into ground feed, comprising in combination, means for cutting, means for grinding, means for conveying the grain from the cutting to the grinding means, means for adding other grains to the grain cut and before it is ground, means for conveying the ground grain from the grinder to a storage receptacle and means for adding syrup to the ground grain in its passage from the grinder to the storage receptacle.

3. A combined harvesting and grinding machine comprising in combination, a truck, a platform thereon, a grain cutting and conveying mechanism projecting from one side thereof, an engine carried thereby, an elevating conveyor, a grinding mill carried by the truck, a conveyor positioned to receive cut grain from the elevator and transfer it to the grinder, means for driving the several movable elements from power received from the engine, a storage tank for molasses positioned at a point elevated above the mill feed, a radiator connected with the engine, a conduit connecting the radiator with the cooling system of the engine, means for circulating cooling water through the radiator, conduit and engine cooling system, a container connected in the conduit, a heat transfer coil positioned in the container, a tubular conduit connecting the molasses tank with one end of the coil, a storage receptacle for the ground grain, means comprising a fan for transferring ground grain from the mill to the storage receptacle, and means connected with the other end of the heat transfer coil for conveying molasses and mixing it with the ground grain in its passage to the storage receptacle.

4. A mechanism for converting standing grain into a mixed feed comprising, a wheel-supported body adapted for movement through a field of grain, a cutting mechanism carried by the body for cutting standing grain through which it is moved, an elevating conveyor disposed adjacent the cutting mechanism in a position to receive the cut grain and adapted to carry the same to an elevated point of discharge, a grinder on the body having a feed inlet adjacent said point of discharge, an element on the body in a position to receive the cut grain discharged by the elevating conveyor, and adapted to deliver the same to the grinder, means on the body for adding other grain to the cut grain prior to its delivery to the grinder, and means on the body for delivering a liquid feed to the mixture.

5. A mechanism for converting standing grain into a mixed feed comprising, a wheel-supported body adapted for movement through a field of grain, a cutting mechanism carried by the body for cutting standing grain through which it is moved, an elevating conveyor disposed adjacent the cutting mechanism in a position to receive the cut grain and adapted to carry the same to an elevated point of discharge, a grinder on the body having a feed inlet adjacent said point of discharge, an element on the body in a position to receive the cut grain discharged by the elevating conveyor, and adapted to deliver the same to the grinder, and means on the body for adding other feed to the grain before it enters the grinder.

WILLIAM H. McELWAIN.